United States Patent
Jeong et al.

(10) Patent No.: US 9,312,579 B2
(45) Date of Patent: Apr. 12, 2016

(54) BATTERY PACK OF EXCELLENT COOLING EFFICIENCY

(71) Applicant: LG CHEM, LTD., Seoul (KR)

(72) Inventors: SangYoon Jeong, Daejeon (KR); Chae Ho Chung, Daejeon (KR); Jong Moon Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 345 days.

(21) Appl. No.: 13/863,134

(22) Filed: Apr. 15, 2013

(65) Prior Publication Data

US 2013/0230754 A1 Sep. 5, 2013

Related U.S. Application Data

(63) Continuation of application No. PCT/KR2011/008306, filed on Nov. 2, 2011.

(30) Foreign Application Priority Data

Nov. 18, 2010 (KR) .................. 10-2010-0114783

(51) Int. Cl.
*H01M 2/12* (2006.01)
*H01M 10/613* (2014.01)
*H01M 10/656* (2014.01)

(52) U.S. Cl.
CPC ........ *H01M 10/5004* (2013.01); *H01M 10/613* (2015.04); *H01M 10/656* (2015.04); *H01M 2220/20* (2013.01)

(58) Field of Classification Search
None
See application file for complete search history.

(56) References Cited

U.S. PATENT DOCUMENTS

| 2004/0180257 | A1* | 9/2004 | Kimoto ................. 429/120 |
| 2006/0093901 | A1* | 5/2006 | Lee et al. ............... 429/120 |
| 2007/0031728 | A1* | 2/2007 | Lee et al. ............... 429/120 |
| 2007/0289789 | A1* | 12/2007 | Tsuchiya ............... 180/68.2 |
| 2010/0285347 | A1* | 11/2010 | Saito et al. ............. 429/120 |
| 2011/0177367 | A1 | 7/2011 | Chung et al. |
| 2011/0189521 | A1 | 8/2011 | Lee et al. |

FOREIGN PATENT DOCUMENTS

EP          2725652 A2    4/2014
JP       2009-004319 A    1/2009

(Continued)

OTHER PUBLICATIONS

International Search Report issued in PCT/KR2011/008306, mailed on Jun. 1, 2012.

*Primary Examiner* — Patrick Ryan
*Assistant Examiner* — Jose Colucci Rios
(74) *Attorney, Agent, or Firm* — Birch, Stewart, Kolasch & Birch, LLP

(57) ABSTRACT

Disclosed is a battery pack including a plurality of battery cells or unit modules, wherein the battery pack is provided at an upper and lower part thereof with a coolant inlet port and a coolant outlet port, through which a coolant to cool the battery cells or the unit modules, i.e. unit cells, flows from one side to the other side of the battery module in a direction perpendicular to the stacked direction of the unit cells, the battery pack case is further provided with a flow space ('coolant introduction part') extending from the coolant inlet port to the battery module and another flow space ('coolant discharge part') extending from the battery module to the coolant outlet port, and the coolant outlet port is bent in a lateral direction at an angle of at least 30 degrees to a flow direction of the coolant introduced through the coolant inlet port.

14 Claims, 8 Drawing Sheets

(56) References Cited

FOREIGN PATENT DOCUMENTS

| JP | 2010-244802 A | 10/2010 |
| KR | 10-0937897 B1 | 1/2010 |
| KR | 10-2010-0012018 A | 2/2010 |
| WO | WO 2005/074054 A1 | 8/2005 |
| WO | WO 2007/097594 A1 | 8/2007 |
| WO | WO 2010/013902 A2 | 2/2010 |
| WO | WO 2010/067944 A1 | 6/2010 |

* cited by examiner

BATTERY PACK OF EXCELLENT COOLING EFFICIENCY

This application is a Continuation of PCT International Application No. PCT/KR2011/008306 filed on Nov. 2, 2011, which claims priority under 35 U.S.C §119(a) to Patent Application No. 10-2010-0114783 filed in the Republic of Korea on Nov. 18, 2010, all of which are hereby expressly incorporated by reference into the present application.

TECHNICAL FIELD

The present invention relates to a battery pack exhibiting high cooling efficiency, and, more particularly, to a battery pack including a coolant inlet port and a coolant outlet port provided at an upper part and a lower part of a battery pack case, respectively, and a coolant introduction part and a coolant discharge part formed at the battery pack case, wherein the coolant outlet port is bent in a lateral direction at an angle of at least 30 degrees to a flow direction of a coolant introduced through the coolant inlet port.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery pack having a plurality of battery cells electrically connected to each other because high power and large capacity are necessary for the middle or large-sized devices.

Preferably, a battery pack is manufactured so as to have as small a size and weight as possible. For this reason, a prismatic battery or a pouch-shaped battery, which can be stacked with high integration and has a small weight to capacity ratio, is usually used as a battery cell of the battery pack. In particular, much interest is currently focused on such a pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for a middle or large-sized battery module to provide power and capacity required by a specific apparatus or device, it is necessary for the middle or large-sized battery module to be configured to have a structure in which a plurality of battery cells is electrically connected in series to each other, and the battery cells are stable against external force.

Also, the battery cells constituting the middle or large-sized battery module are secondary batteries which can be charged and discharged. Consequently, a large amount of heat is generated from the high power, large capacity secondary batteries during the charge and discharge of the batteries. If the heat, generated from the unit cells during the charge and discharge of the unit cells, is not effectively removed, the heat accumulates in the respective unit cells with the result that the deterioration of the unit cells is accelerated. According to circumstances, the unit cells may catch fire or explode. For this reason, a cooling system is needed in a battery pack for vehicles, which is a high power, large capacity battery, to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to optimize the shape of a flow channel, thereby minimizing temperature deviation during the flow of a coolant.

Some conventional middle or large-sized battery packs use a battery pack case configured to have a structure in which a coolant inlet port and a coolant outlet port are located at the upper part and the lower part of the battery pack case, respectively, such that the coolant inlet port and the coolant outlet port are directed in opposite directions, and the top and bottom of a flow space extending from the coolant inlet port to a battery module are parallel to each other. In this structure, however, coolant flux in a flow channel adjacent to the coolant outlet port is greatly reduced with the result that temperature deviation between battery cells is high.

In connection with this case, there is disclosed a middle or large-sized battery pack configured to have a structure in which an air guide plane is inclined downward to the side of a battery pack case opposite to battery cells such that the air guide plane becomes closer to the battery cells with the increase in distance between the air guide plane and a coolant inlet port. Specifically, the air guide plane is inclined at a predetermined angle, for example an angle of 15 to 45 degrees, to the side of the battery pack case opposite to the battery cells, and the coolant inlet port is formed in parallel, thereby restraining the occurrence of a phenomenon in which a coolant is excessively introduced into a flow channel adjacent to a coolant outlet port.

However, the inventors of the present application have found that it is not possible to achieve desired cooling uniformity through the above structure, and, in particular, temperature deviation between the battery cells is changed depending upon the position of the coolant outlet port.

DISCLOSURE

Technical Problem

Therefore, the present invention has been made to solve the above problems and other technical problems that have yet to be resolved.

As a result of a variety of extensive and intensive studies and experiments on a battery pack, the inventors of the present application have found that, when a coolant outlet port is bent in a lateral direction at a specific angle to a flow direction of a coolant introduced through a coolant inlet port, cooling uniformity of the battery pack is high. The present invention has been completed based on these findings.

Technical Solution

In accordance with one aspect of the present invention, the above and other objects can be accomplished by the provision of a battery pack including a plurality of battery cells or unit modules, each of which has two or more battery cells mounted therein, mounted in a battery pack case such that the battery cells or the unit modules are stacked in an upright or upside-down fashion, wherein the battery pack case is provided at an upper part and a lower part thereof with a coolant inlet port and a coolant outlet port, through which a coolant to cool the battery cells or the unit modules, i.e. unit cells, flows from one side to the other side of the battery module in a direction perpendicular to the stacked direction of the unit cells, the battery pack case is further provided with a flow space ('coolant introduction part') extending from the coolant inlet port to the battery module and another flow space ('coolant discharge part') extending from the battery module to the coolant outlet port, and the coolant outlet port is bent in a lateral direction at an angle of at least 30 degrees to a flow direction of the coolant introduced through the coolant inlet port.

In a case in which the coolant inlet port and the coolant outlet port are located at the upper part and the lower part of the battery pack case, respectively, such that the coolant inlet port and the coolant outlet port are directed in opposite directions as in the conventional battery pack, a coolant is excessively introduced into flow channels defined between the battery cells or the unit modules adjacent to the coolant outlet port. Specifically, in a case in which a blow fan is mounted in the coolant inlet port, the coolant is excessively driven to the end of the battery pack case opposite to the coolant inlet port by the blow fan with the result that the battery cells or the unit modules adjacent to the coolant outlet port are overcooled. On the other hand, in a case in which a suction fan is mounted in the coolant outlet port, negative pressure in the coolant flow channels adjacent to the coolant outlet port is increased. As a result, the coolant is excessively driven into the coolant flow channels adjacent to the coolant outlet port, and therefore, the battery cells or the unit modules adjacent to the coolant outlet port are overcooled.

In connection with this case, the inventors of the present application have found that, in a case in which the coolant outlet port is not located at the end of the battery pack case opposite to the coolant inlet port but at the side of the battery pack case, the coolant uniformly flows into the coolant flow channels between the respective battery cells or the unit modules.

That is, in a case in which the coolant outlet port is not located at the end of the battery pack case opposite to the coolant inlet port but in the lateral direction at a predetermined angle, the coolant, introduced into the stacked direction of the battery cells or the unit modules, is discharged in the lateral direction with the result that the difference in flow rate between the battery cells or the unit modules adjacent to the coolant inlet port and the battery cells or the unit modules adjacent to the end of the battery pack case opposite to the coolant inlet port is greatly reduced, and therefore, temperature deviation is greatly reduced.

In connection with this case, a structure in which the coolant outlet port is bent in the lateral direction at an angle of less than 30 degrees to the flow direction of the coolant introduced through the coolant inlet port is not significantly different from a structure in which the coolant outlet port is located at the end of the battery pack case opposite to the coolant inlet port or a structure in which the coolant outlet port is formed in the same direction as the coolant inlet port, which is not preferable.

In a preferred example, the coolant outlet port may be bent in the lateral direction at an angle of 70 to 110 degrees to the flow direction of the coolant introduced through the coolant inlet port.

If the coolant outlet port is bent at an angle of less than 70 degrees or greater than 110 degrees, coolant discharge efficiencies at a portion at which the angle between the coolant outlet port and the battery pack case is small or at a portion at which the angle between the coolant outlet port and the battery pack case is large may be different from each other. That is, the flow direction of the coolant is refracted at an angle of greater than 110 degrees at the portion at which the angle between the coolant outlet port and the battery pack case is small, and the flow direction of the coolant is refracted at an angle of less than 70 degrees at the portion at which the angle between the coolant outlet port and the battery pack case is large. As a result, coolant discharge efficiencies may be different from each other. This affects flow rate of the coolant flowing in the coolant flow channels at the corresponding region of the battery module with the result that cooling uniformity of the battery cells or the unit modules is lowered.

For the above reason, the coolant outlet port may be formed in the lateral direction at an angle of 90 degrees to the flow direction of the coolant introduced through the coolant inlet port.

The upper end inside of the coolant introduction part may have an inclined plane inclined with respect to the top of the unit cell stack such that the coolant introduction part is widened from the end of the battery pack case opposite to the coolant inlet port to the coolant inlet port.

In a case in which the upper end inside of the coolant introduction part is parallel to the top of the unit cell stack or the unit module stack, flow rate of the coolant in the flow channels adjacent to the coolant inlet port is greatly reduced with the result that temperature deviation between the battery cells or the unit modules is increased.

On the other hand, it a case in which the upper end inside of the coolant introduction part has the inclined plane, it is possible to reduce temperature deviation between the battery cells or the unit modules, thereby preventing lowering in performance of the battery pack.

In a preferred example, the inclined introduction part may have an inclination angle of 3 to 8 degrees.

If the inclined introduction part has an inclination angle of less than 3 degrees, it is not possible to efficiently reduce temperature deviation between the battery cells or the unit modules since this structure is not greatly different from a structure in which the inclined introduction part is parallel. On the other hand, if the inclined introduction part has an inclination angle of greater than 8 degrees, the width of the coolant inlet port is increased with the result that it is not possible to manufacture a compact battery pack. In addition, as the sectional area of the coolant inlet port is increased, the velocity of the coolant may be decreased, and therefore, the flow rate of the coolant in the flow channels adjacent to the coolant inlet port may be increased, which is not preferable.

Also, in a case in which the coolant inlet port is inclined at an inclination angle greater than that of the upper end inside of the coolant introduction part, it is possible to further reduce the temperature deviation between the battery cells or the unit modules. The coolant inlet port may have an inclination angle of 20 to 80 degrees.

The width of the coolant inlet port greatly affects the temperature deviation between the unit cells except in the case in which the upper end inside of the coolant introduction part is configured to have the specific inclined structure as previously described.

When the coolant inlet port has a width equivalent to 5 to 25% the length of the battery pack case corresponding to the length of the unit cell stack, therefore, it is possible to more efficiently reduce temperature deviation of the coolant caused depending upon device installation conditions. Preferably, the coolant inlet port has a width equivalent to 10 to 20% the length of the battery pack case corresponding to the length of the unit cell stack.

The end of the battery pack case opposite to the coolant inlet port may be spaced apart from the top of the unit cell stack by a height equivalent to 10% or less the height of the unit cell stack. This structure appropriately restricts the amount of the coolant reaching the end of the battery pack case opposite to the coolant inlet port, thereby further improving uniform distribution of the coolant to the unit cells.

In this case, the end of the battery pack case opposite to the coolant inlet port may be spaced apart from the top of the unit cell stack by a height of 1 to 10 mm.

Meanwhile, the battery pack according to the present invention is preferably applied to a structure having critical cooling efficiency, i.e. a structure in which the length of the battery pack case in the stacked direction of the unit cells is relatively greater than that of the battery pack case in the lateral direction of each of the unit cells.

The coolant discharge part may have a uniform height with respect to the bottom of the unit cell stack. That is, the bottom of the coolant discharge part facing the bottom of the unit cell stack may have the same height as the bottom of the unit cell stack. Alternatively, the structure of the coolant discharge part may be partially changed to improve coolant discharge efficiency.

In a preferred example, the coolant inlet port or the coolant outlet port may have a fan mounted therein to drive a coolant, introduced through the coolant inlet port, to the coolant outlet port after the coolant passes through the battery module.

Specifically, the fan may be a blow fan mounted in the coolant inlet port to blow a coolant to the battery module or a suction fan mounted in the coolant outlet port to suction a coolant from the battery module. The blow fan and the suction fan may be simultaneously used.

Each of the unit modules may be configured to have a structure comprising two or more battery cells, electrode terminals of which are connected in series to each other, and a pair of module housings coupled to cover outsides of the battery cells excluding the electrode terminals of the battery cells.

The module housings restrain the repetitive expansion and contraction change of the battery cells during the charge and discharge of the battery cells, while protecting the battery cells having low mechanical strength, thereby preventing separation between sealed regions of the battery cells.

The structure of the module housings is not particularly restricted so long as the battery cells are mounted in the module housings. In an unlimited example, the module housings may have an internal structure corresponding to the external shape of the battery cell stack. In particular, the module housings may be coupled to each other in an assembly type fastening fashion without using additional fastening members.

In a preferred example, each of the unit modules may be configured to have a structure in which two battery cells are mounted in module housings made of a metallic material.

The battery cells are secondary batteries having a small thickness and a relatively large width and length such that the total size of the secondary batteries is minimized when the secondary batteries are stacked to construct a battery module. In a preferred example, each battery cell may be a secondary battery configured to have a structure in which an electrode assembly is mounted in a battery case made of a laminate sheet including a resin layer and a metal layer, and electrode terminals protrude from upper and lower ends of the battery case. Specifically, each battery cell may be configured to have a structure in which an electrode assembly is mounted in a pouch-shaped battery case made of an aluminum laminate sheet. The secondary battery with the above-stated construction may be referred to as a pouch-shaped battery cell.

A cell case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly includes cathodes and anodes, by which the charge and the discharge of the battery are possible. The electrode assembly may be configured to have a structure in which cathodes and anodes are stacked while separators are disposed respectively between the cathodes and the anodes. For example, the electrode assembly may be configured to have a jelly-roll type structure, a stacked type structure, or a stacked/folded type structure. The cathodes and the anodes of the electrode assembly may be configured such that electrode tabs of the cathodes and electrode tabs of the anodes directly protrude outward from the battery. Alternatively, the cathodes and the anodes of the electrode assembly may be configured such that the electrode tabs of the cathodes and the electrode tabs of the anodes are connected to additional leads, and the leads protrude outward from the battery.

The battery cells may be connected in series and/or parallel to each other in one battery module, or the battery cells of one battery module may be connected in series and/or parallel to the battery cells of another battery module. In a preferred example, a plurality of battery modules may be manufactured by coupling electrode terminals of the battery cells to each other in a state in which the battery cells are arranged in series in the longitudinal direction such that the electrode terminals of the battery cells are successively adjacent to each other, bending two or more battery cells such that the battery cells are stacked, and covering a predetermined number of stacked battery cells using module housings.

The coupling between the electrode terminals may be achieved in various manners, such as welding, soldering, and mechanical coupling. Preferably, the coupling between the electrode terminals is achieved by welding.

Of the outer edge sealed portion of the battery cell, the side sealed portion may be bent so as to approximately coincide with the inner shape of the module housings. As a result, space utilization is improved, and therefore, it is possible to manufacture a compact battery module.

In a structure in which the electrode terminals protrude outward from the upper and lower ends of the battery cell as described above, if an odd number of battery cells are connected in series to each other, the electrode terminals are located at the opposite ends of the battery cells in each unit module with the result that the subsequent process is not easily performed. For this reason, it is preferable to connect an even number of battery cells in series to each other.

Also, the module housings may be provided at the outer edges thereof with protrusions to provide flow channels when the module housings are stacked. When the unit modules are stacked, the protrusions come into contact with each other to form flow channels, through which a coolant flows, between the protrusions.

In another preferred example, portions of the module housings corresponding to the portions of the battery cells from which the electrodes protrude outward may be lower than the remaining portions of the module housings to fix the portions of the battery cells from which the electrodes protrude outward.

The battery cells are not particularly restricted so long as the battery cells are secondary batteries which can be charged and discharged. Preferably, the battery cells are lithium secondary batteries, each of which has a large power or capacity to weight ratio.

In accordance with another aspect of the present invention, there is provided a vehicle using the battery pack with the above-stated construction as a power source, having a limited installation space, and exposed to frequent vibration and strong impact.

In a preferred example, the vehicle may be an electric vehicle, a hybrid electric vehicle, or a plug-in hybrid electric vehicle requiring high power and large capacity.

Of course, the battery pack used as the power source of the vehicle may be combined and manufactured based on desired power and capacity.

In this case, the vehicle may be an electric vehicle, a hybrid electric vehicle, or a plug-in hybrid electric vehicle wherein the battery pack is installed in the lower end of a trunk of the vehicle or between a rear seat and the trunk of the vehicle.

The electric vehicle, the hybrid electric vehicle, or the plug-in hybrid electric vehicle using the battery pack as the power source thereof are well known in the art to which the present invention pertains, and therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
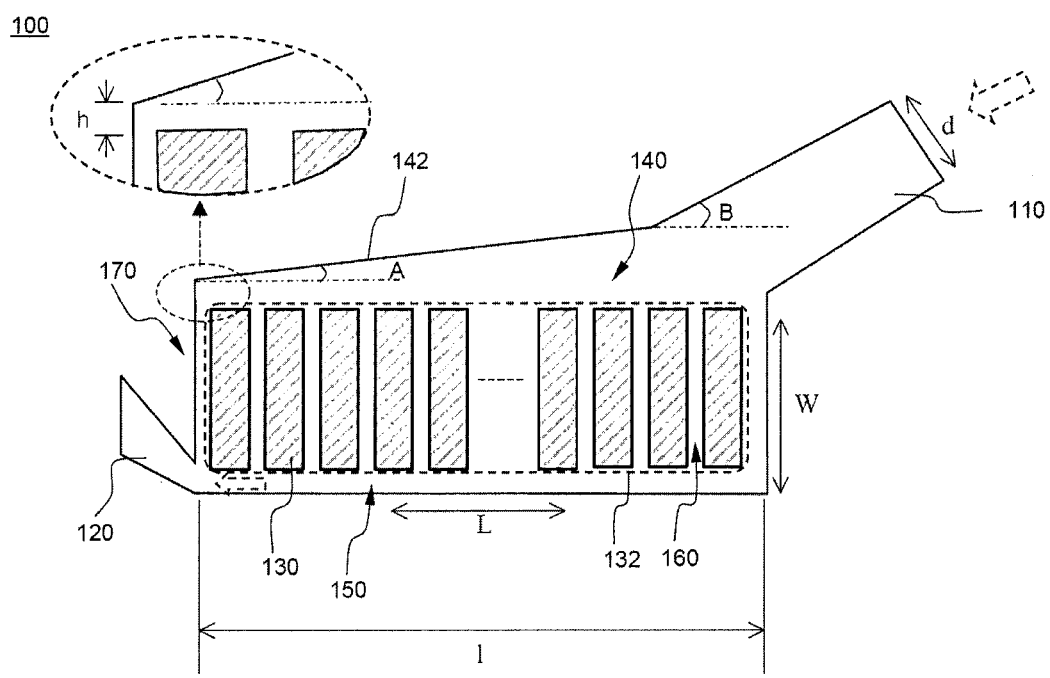
FIG. 1 is a vertical sectional view showing a conventional battery pack configured to have a structure in which the upper end of a coolant introduction part is inclined.

FIG. 1 is a vertical sectional view typically showing a conventional battery pack configured to have a structure in which the upper end of a coolant introduction part is inclined.

Referring to FIG. 1, a battery pack 100 includes a battery module 132 configured to have a structure in which a plurality of unit modules 130 is stacked such that the unit modules 130 are electrically connected to each other, a pack case 170 in which the battery module 132 is mounted, a coolant introduction part 140, which is a flow space extending from a coolant inlet port 110 to the battery module 132, and a coolant discharge part 150, which is a flow space extending from the battery module 132 to a coolant outlet port 120.

A coolant, introduced through the coolant inlet port 110, flows through the coolant introduction part 140 and flow channels 160 defined between the respective unit modules 130. At this time, the coolant cools the unit modules 130. After that, the coolant flows through the coolant discharge part 150 and is then discharged out of the pack case through the coolant outlet port 120.

The coolant inlet port 110 and the coolant outlet port 120 are formed at the upper part and the lower part of the pack case 170, respectively, in opposite directions such that a coolant flows to one side to the other side of the battery module 132 in a direction perpendicular to the stacked direction of the unit modules 130. An upper end 142 of the coolant introduction part 140 is inclined.

In the above structure, coolant distribution is improved as compared with in a structure in which the upper end of the coolant introduction part 140 is parallel. However, a relatively larger amount of the coolant is introduced into the flow channels between the unit modules adjacent to the coolant outlet port 120, whereas a relatively smaller amount of the coolant is introduced into the flow channels between the unit modules adjacent to the coolant inlet port 110. As a result, the unit modules 130 are not uniformly cooled, and therefore, temperate deviation is generated between the unit modules adjacent to the coolant outlet port 120 and the unit modules adjacent to the coolant inlet port 110.

Figure 2:
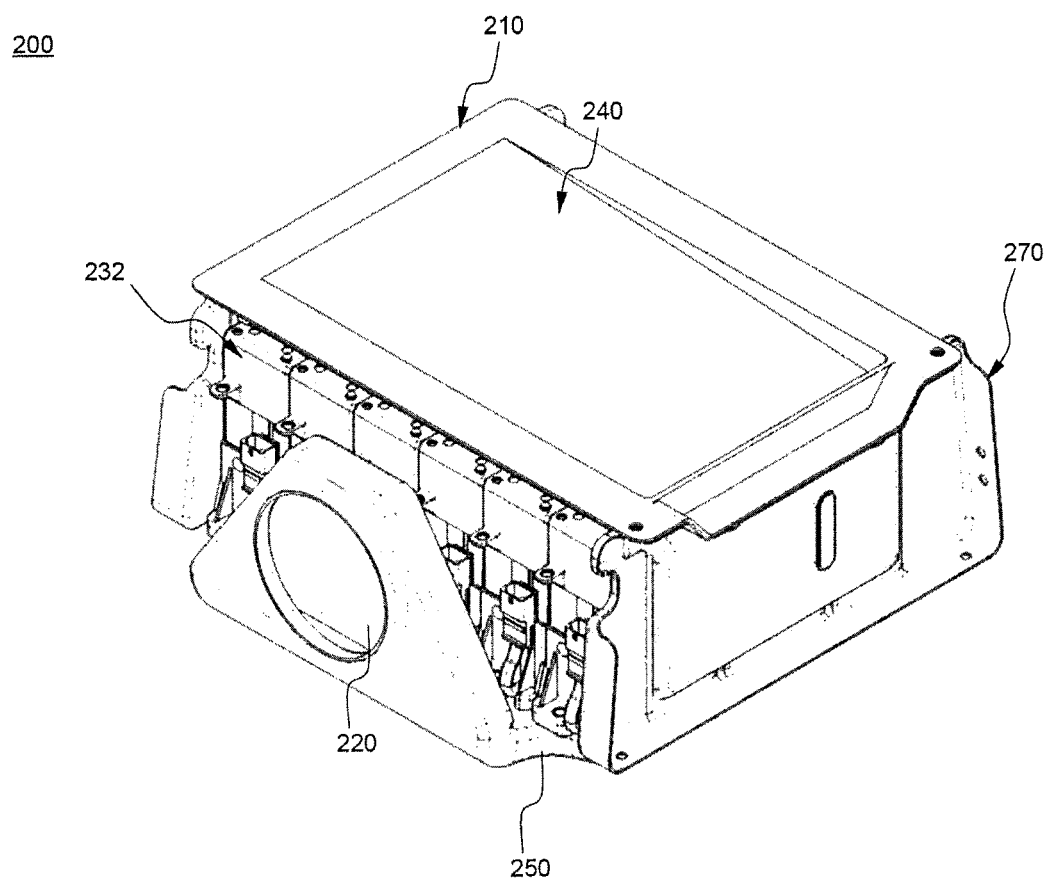
FIG. 2 is a perspective view showing a battery pack according to an embodiment of the present invention.

FIG. 2 is a perspective view typically showing a battery pack according to an embodiment of the present invention.

Referring to FIG. 2, a battery pack 200 includes a battery module 232 configured to have a structure in which a plurality of unit modules (not shown) is stacked such that the unit modules are electrically connected to each other, a pack case 270 in which the battery module 232 is mounted, a coolant introduction part 240, which is a flow space extending from a coolant inlet port 210 to the battery module 232, and a coolant discharge part 250, which is a flow space extending from the battery module 232 to a coolant outlet port 220. An upper end of the coolant introduction part 240 is inclined. The coolant outlet port 220 is formed in a lateral direction at an angle of 90 degrees to a flow direction of a coolant introduced through the coolant inlet port 210.

In the above structure, the coolant outlet port is located at the middle of the battery module 232 in the stacked direction of the unit modules. Consequently, it is possible to reduce the difference in flow rate of a coolant depending upon positions of flow channels (not shown) defined between the respective unit modules (not shown) in the pack case 270.

In particular, this phenomenon is more effective in a case in which a suction fan (not shown) is mounted in the coolant outlet port 220 to suction a coolant from the battery module 232. When the coolant is suctioned by the suction fan, deviation of negative pressure in the flow channels between the respective unit modules is little in the above structure, and therefore, deviation in flow rate between the respective flow channels is reduced.

Figure 3:
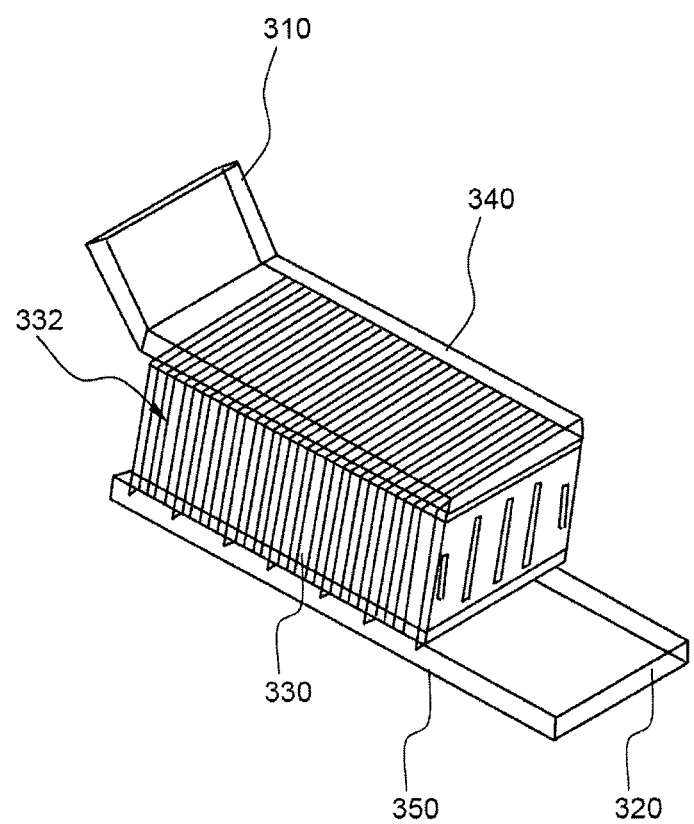
FIG. 3 is a typical see-through view showing a conventional battery pack configured to have a structure in which a coolant introduction part is parallel.
Figure 4:
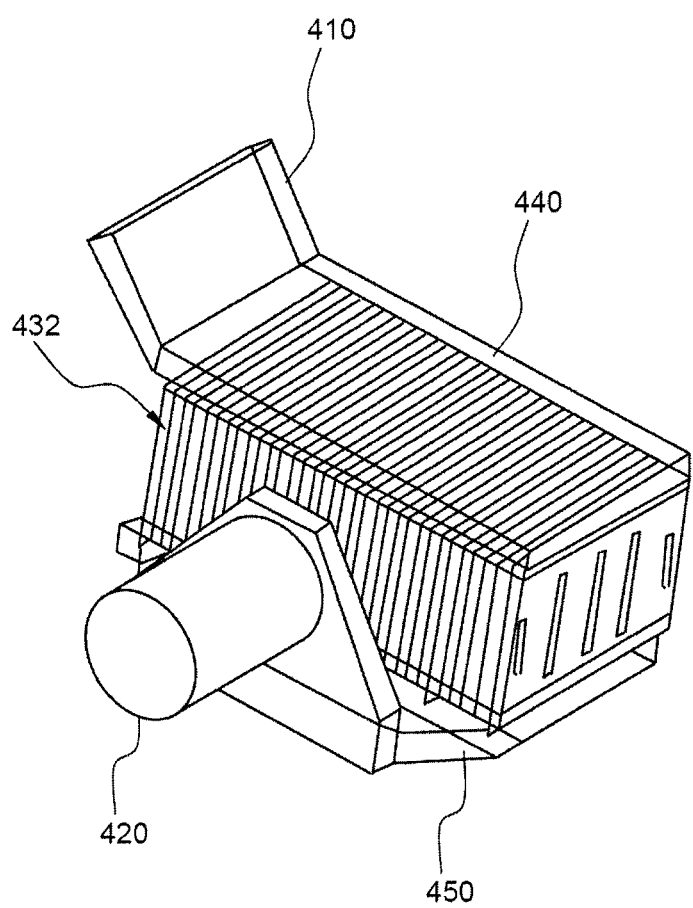
FIG. 4 is a typical see-through view showing a battery pack according to another embodiment of the present invention.
Figure 5:
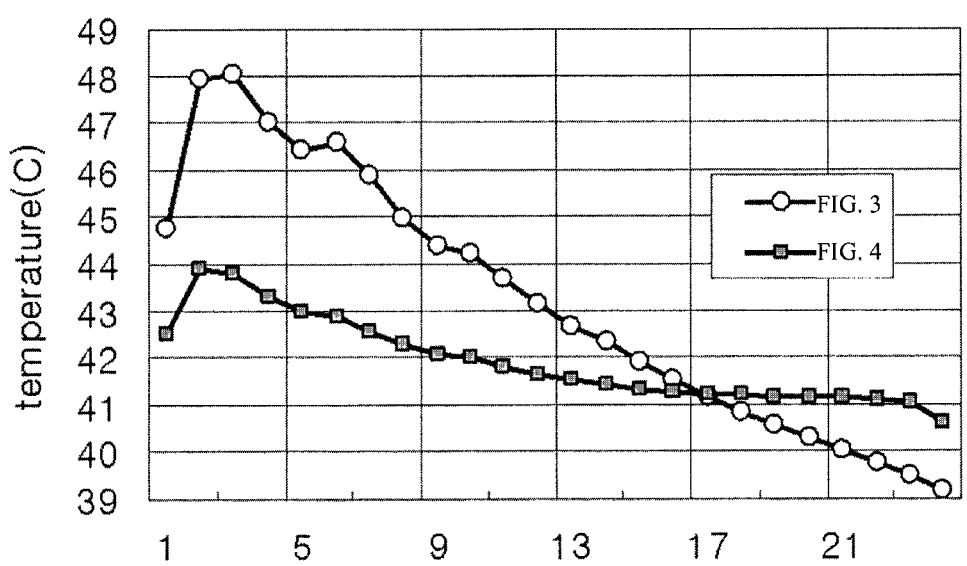
FIG. 5 is a graph showing measurement results of temperature deviation between unit modules in the battery packs of FIGS. 3 and 4.

FIG. 3 is a see-through view typically showing a conventional battery pack configured to have a structure in which the upper end of a coolant introduction part is parallel, FIG. 4 is a see-through view typically showing a battery pack according to another embodiment of the present invention, and FIG. 5 is a graph showing measurement results of temperature deviation between unit modules in the battery packs.

Referring to FIG. 3, a battery pack 300 includes a coolant introduction part 340, which is a flow space extending from a coolant inlet port 310 to a battery module 332, and a coolant discharge part 350, which is a flow space extending from the battery module 332 to a coolant outlet port 320. An upper end of the coolant introduction part 340 is parallel to the upper end of the battery module 332. The coolant inlet port 310 and the coolant outlet port 320 are formed at the upper part and the lower part of a pack case (not shown), respectively, in opposite directions.

Referring to FIG. 4, a battery pack 400 includes a coolant introduction part 440, which is a flow space extending from a coolant inlet port 410 to a battery module 432, and a coolant discharge part 450, which is a flow space extending from the battery module 432 to a coolant outlet port 420. An upper end of the coolant introduction part 440 is parallel to the upper end of the battery module 432. The coolant outlet port 420 is formed in a lateral direction at an angle of 90 degrees to a flow direction of a coolant introduced through the coolant inlet port 410.

Referring to FIG. 5 together with FIGS. 3 and 4, there are shown the measurement results of temperatures of unit modules stacked in the pack cases (not shown) of the battery packs 300 and 400 of FIGS. 3 and 4 from the unit modules adjacent to the coolant inlet ports 310 and 410 to the unit modules adjacent to the coolant outlet ports 320 and 420. That is, unit module number 1 indicates a unit module adjacent to each of the coolant inlet ports 310 and 410, and unit module number 24 indicates a unit module adjacent to each of the coolant outlet ports 320 and 420.

The temperature measurement experiments were carried out under conditions in which a predetermined load was applied to the battery cells and external temperature was maintained at room temperature.

The experiment results revealed that the temperature deviation between the unit modules of the battery pack 300 was about 9° C. On the other hand, the temperature deviation between the unit modules of the battery pack 400 according to the embodiment of the present invention was about 3° C. That is, cooling uniformity of the battery pack 400 according to the embodiment of the present invention is about three times higher than that of the conventional battery pack 300.

Figure 6:
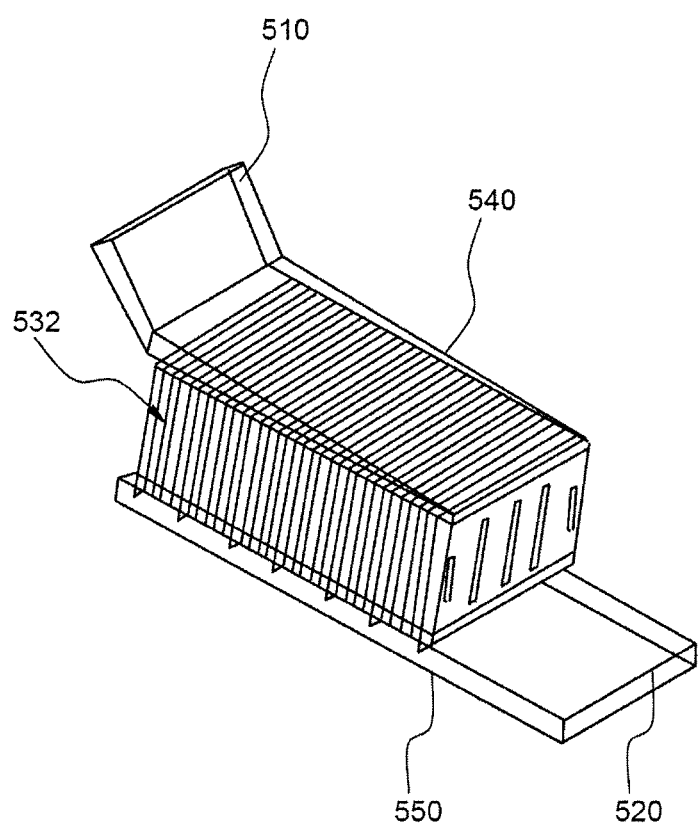
FIG. 6 is a typical see-through view showing a conventional battery pack configured to have a structure in which the upper end of a coolant introduction part is inclined.
Figure 7:
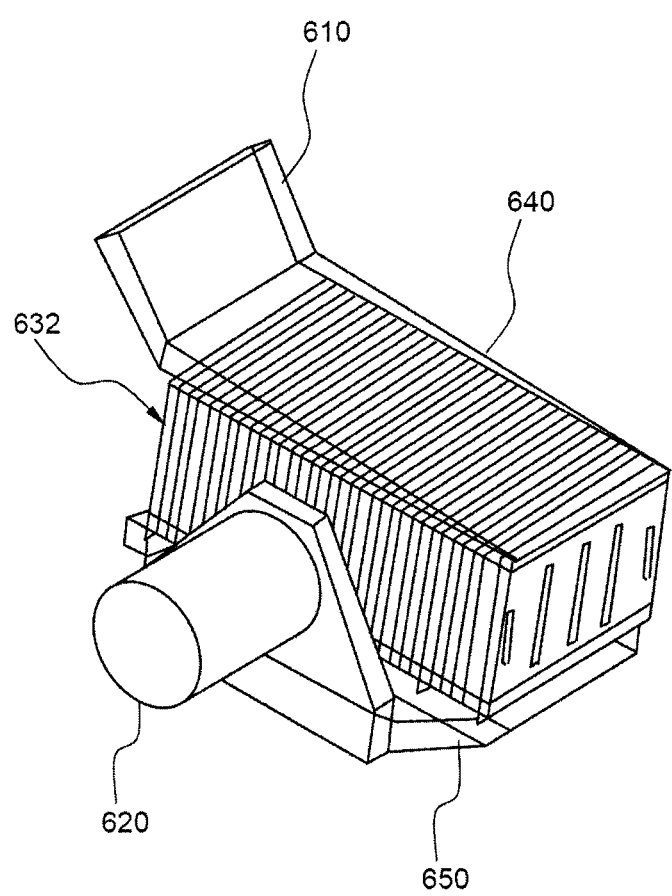
FIG. 7 is a typical see-through view showing a battery pack according to a further embodiment of the present invention.
Figure 8:
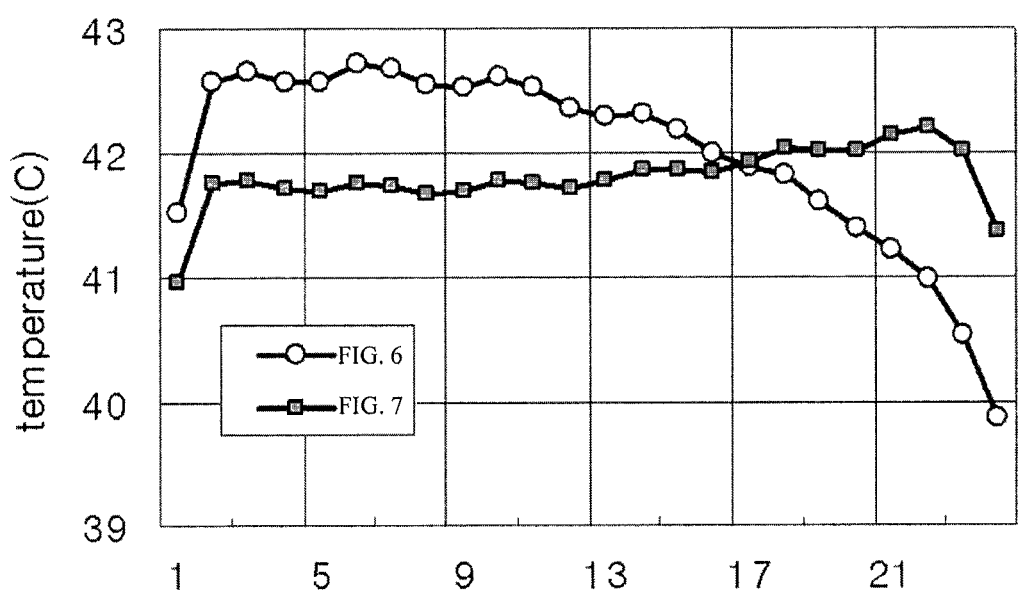
FIG. 8 is a graph showing measurement results of temperature deviation between unit modules in the battery packs of FIGS. 6 and 7.

FIG. 6 is a typical see-through view showing a conventional battery pack configured to have a structure in which the upper end of a coolant introduction part is inclined, FIG. 7 is a typical see-through view showing a battery pack according to a further embodiment of the present invention, and FIG. 8 is a graph showing measurement results of temperature deviation between unit modules in the battery packs.

Referring to FIG. 6, a battery pack 500 includes a coolant introduction part 540, which is a flow space extending from a coolant inlet port 510 to a battery module 532, and a coolant discharge part 550, which is a flow space extending from the battery module 532 to a coolant outlet port 520. An upper end of the coolant introduction part 540 is inclined. The coolant inlet port 510 and the coolant outlet port 520 are formed at the upper part and the lower part of a pack case (not shown), respectively, in opposite directions.

Referring to FIG. 7, a battery pack 600 includes a coolant introduction part 640, which is a flow space extending from a coolant inlet port 610 to a battery module 632, and a coolant discharge part 650, which is a flow space extending from the battery module 632 to a coolant outlet port 620. An upper end of the coolant introduction part 640 is inclined. The coolant outlet port 620 is formed in a lateral direction at an angle of 90 degrees to a flow direction of a coolant introduced through the coolant inlet port 610.

Referring to FIG. 8 together with FIGS. 6 and 7, there are shown the measurement results of temperatures of unit modules stacked in the pack cases (not shown) of the battery packs 500 and 600 of FIGS. 6 and 7 from the unit modules adjacent to the coolant inlet ports 510 and 610 to the unit modules adjacent to the coolant outlet ports 520 and 620. That is, unit module number 1 indicates a unit module adjacent to each of the coolant inlet ports 510 and 610, and unit module number 24 indicates a unit module adjacent to each of the coolant outlet ports 520 and 620.

The temperature measurement experiments were carried out under conditions in which a predetermined load was applied to the battery cells and external temperature was maintained at room temperature.

The experiment results revealed that the temperature deviation between the unit modules of the battery pack 500 was about 3° C., which shows that the battery pack 500 exhibits cooling efficiency higher than that of the battery pack 300 of FIG. 3. On the other hand, the temperature deviation between the unit modules of the battery pack 600 according to the embodiment of the present invention was about 1° C. That is, cooling uniformity of the battery pack 600 according to the embodiment of the present invention is about three times higher than that of the conventional battery pack 500.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention has an effect in that cooling deviation between battery cells is reduced, thereby improving cooling uniformity between the battery cells and thus improving the performance of the battery pack.

The invention claimed is:

1. A battery pack comprising a plurality of battery cells or unit modules, each of which has two or more battery cells mounted therein, mounted in a battery pack case such that the battery cells or the unit modules are stacked in an upright or upside-down fashion, wherein the battery pack case is provided at an upper part and a lower part thereof with a coolant inlet port and a coolant outlet port, through which a coolant to cool the battery cells or the unit modules flows from one side to the other side of the battery module in a direction perpendicular to the stacked direction of the battery cells or the unit modules, the battery pack case is further provided with a coolant introduction part extending from the coolant inlet port to the battery module and a coolant discharge part extending from the battery module to the coolant outlet port, and the coolant outlet port is bent in a lateral direction at an angle of 70 to 110 degrees to a flow direction of the coolant introduced through the coolant inlet port.

2. The battery pack according to claim 1, wherein the coolant outlet port is formed in a lateral direction at an angle of 90 degrees to a flow direction of the coolant introduced through the coolant inlet port.

3. The battery pack according to claim 1, wherein an upper end inside of the coolant introduction part has an inclined plane inclined with respect to a top of the stacked battery cells or unit modules such that the coolant introduction part is widened from an end of the battery pack case opposite to the coolant inlet port to the coolant inlet port.

4. The battery pack according to claim 3, wherein the inclined plane has an inclination angle of 3 to 8 degrees.

5. The battery pack according to claim 1, wherein the coolant inlet port has a width equivalent to 5 to 25% a length of the battery pack case corresponding to a length of the stacked battery cells or unit modules.

6. The battery pack according to claim 3, wherein the end of the battery pack case opposite to the coolant inlet port is spaced apart from the top of the stacked battery cells or unit modules by a height equivalent to 10% or less a height of the stacked battery cells or unit modules.

7. The battery pack according to claim 6, wherein the end of the battery pack case opposite to the coolant inlet port is spaced apart from the top of the stacked battery cells or unit modules by a height of 1 to 10 mm.

8. The battery pack according to claim 1, wherein the battery pack case is configured such that a length of the battery pack case in the stacked direction of the battery cells or unit modules is relatively greater than that of the battery pack case in a lateral direction of each of the battery cells or unit modules perpendicular to the stacked direction of the battery cells or unit modules.

9. The battery pack according to claim 1, wherein the coolant discharge part has a uniform height with respect to a bottom of the stacked battery cells or unit modules.

10. The battery pack according to claim 1, wherein the coolant inlet port or the coolant outlet port has a fan mounted therein to drive the coolant, introduced through the coolant inlet port, to the coolant outlet port after the coolant passes through the battery module.

11. The battery pack according to claim 1, wherein each of the unit modules is configured to have a structure comprising two or more battery cells, electrode terminals of which are connected in series to each other, and a pair of sheathing members coupled to cover outsides of the battery cells excluding the electrode terminals of the battery cells.

12. The battery pack according to claim 10, wherein each of the unit modules is configured to have a structure in which two battery cells are mounted in a sheathing member made of a metallic material.

13. A vehicle comprising a battery pack according to claim 1 as a power source.

14. The vehicle according to claim 13, wherein the vehicle is an electric vehicle, a hybrid electric vehicle, or a plug-in hybrid electric vehicle.

* * * * *